(12) United States Patent  
Mittal et al.

(10) Patent No.: US 12,094,459 B2  
(45) Date of Patent: Sep. 17, 2024

(54) AUTOMATED DOMAIN-SPECIFIC CONSTRAINED DECODING FROM SPEECH INPUTS TO STRUCTURED RESOURCES

(71) Applicant: International Business Machines Corporation, Armonk, NY (US)

(72) Inventors: Ashish R Mittal, Bangalore (IN); Samarth Bharadwaj, Bangalore (IN); Shreya Khare, Bangalore (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 17/568,960

(22) Filed: Jan. 5, 2022

(65) Prior Publication Data

US 2023/0215427 A1 Jul. 6, 2023

(51) Int. Cl.
| | |
|---|---|
| *G10L 15/06* | (2013.01) |
| *G06F 40/143* | (2020.01) |
| *G06F 40/174* | (2020.01) |
| *G06N 20/00* | (2019.01) |

(Continued)

(52) U.S. Cl.
CPC .......... *G10L 15/187* (2013.01); *G06F 40/143* (2020.01); *G06F 40/174* (2020.01);

(Continued)

(58) Field of Classification Search
None
See application file for complete search history.

(56) References Cited

U.S. PATENT DOCUMENTS

| 7,092,888 B1 * | 8/2006 | McCarthy ........... G10L 15/1822 |
| | | 704/277 |
| 9,047,870 B2 * | 6/2015 | Ballinger ................ G06F 3/167 |

(Continued)

OTHER PUBLICATIONS

Champawat, T., Voice-Driven Web Forms: Speech to Text, InfoBeans, Apr. 28, 2020.

(Continued)

*Primary Examiner* — Richard Z Zhu (74) *Attorney, Agent, or Firm* — Ryan, Mason & Lewis, LLP (57) ABSTRACT

Methods, systems, and computer program products for automated domain-specific constrained decoding from speech inputs to structured resources are provided herein. A computer-implemented method includes converting at least a portion of at least one user-provided speech utterance into text by processing the at least one user-provided speech utterance using an artificial intelligence-based automatic speech recognition model; automatically training an artificial intelligence-based decoding engine, wherein automatically training the artificial intelligence-based decoding engine comprising constraining the artificial intelligence-based decoding engine based at least in part on a domain-specific model and the artificial intelligence-based automatic speech recognition model; and generating at least one of one or more domain-specific text outputs related to one or more structured resources associated with the domain and one or more domain-specific action outputs related to the one or more structured resources associated with the domain by processing at least a portion of the text using the artificial intelligence-based decoding engine.

20 Claims, 9 Drawing Sheets

(51) Int. Cl.
*G10L 15/187* (2013.01)
*G10L 15/22* (2006.01)
*G10L 15/30* (2013.01)
*G10L 19/00* (2013.01)
*H04L 67/10* (2022.01)

(52) U.S. Cl.
CPC ............ *G06N 20/00* (2019.01); *G10L 15/063* (2013.01); *G10L 15/22* (2013.01); *G10L 15/30* (2013.01); *G10L 19/00* (2013.01); *H04L 67/10* (2013.01); *G10L 2015/0633* (2013.01); *G10L 2015/0635* (2013.01); *G10L 2015/223* (2013.01)

(56) References Cited

U.S. PATENT DOCUMENTS

| | | | | |
|---|---|---|---|---|
| 9,299,345 | B1* | 3/2016 | Gilbert | G10L 15/30 |
| 10,431,206 | B2* | 10/2019 | Sak | G10L 15/02 |
| 10,679,643 | B2* | 6/2020 | Diamos | G10L 19/00 |
| 11,294,975 | B1* | 4/2022 | Devageorge | G06F 16/632 |
| 11,315,548 | B1* | 4/2022 | Heikinheimo | G10L 15/065 |
| 11,449,744 | B2* | 9/2022 | Chen | G06N 3/044 |
| 11,783,173 | B2* | 10/2023 | Hakkani-Tur | G10L 15/22 706/25 |
| 2009/0254347 | A1 | 10/2009 | Moore et al. | |
| 2017/0293600 | A1 | 10/2017 | Stent et al. | |
| 2020/0349923 | A1 | 11/2020 | Hu et al. | |
| 2023/0081306 | A1* | 3/2023 | Kuo | G06N 3/0455 704/200 |

OTHER PUBLICATIONS

West., M., Accepting Speech Input in HTML5 Forms, Treehouse Blog, https://blog.teamtreehouse.com/accepting-speech-input-html5-forms , Jan. 16, 2014.

Hiregoudar et al., Speech to SQL Generator—A Voice Based Approach, Journal of Basic and Applied Research International, Jan. 2019.

Google, VoiceFiller Speech to Text for Website Forms, https://chrome.google.com/webstore/detail/voicefiller-speech-to-tex/mgafhkmkdcbkjajcblfijmlpiknfhffl?hl=en , May 17, 2022.

Shah et al., SpeakQL: Towards Speech-driven Multimodal Querying of Structured Data, 2020 Association for Computing Machinery.

Hu et al., Improved Lexically Constrained Decoding for Translation and Monolingual Rewriting, Proceedings of NAACL-HLT 2019.

Balakrishnan et al., Constrained Decoding for Neural NLG from Compositional Representations in Task-Oriented Dialogue, arXiv:1906.07220v1 [cs.CL] Jun. 17, 2019.

Rongali et al., Don't Parse, Generate! A Sequence to Sequence Architecture for Task-Oriented Semantic Parsing, 2020 IW3C2 (International World Wide Web Conference Committee).

Gupta et al., Semantic Parsing for Task Oriented Dialog using Hierarchical Representations, Conference on Empirical Methods in Natural Language Processing (EMNLP) 2018.

Baevski et al., wav2vec 2.0: A Framework for Self-Supervised Learning of Speech Representations, arXiv.org, 2020.

GitHub, wav2vec 2.0, https://github.com/pytorch/fairseq/blob/master/examples/wav2vec/README.md, Apr. 13, 2022.

Lu et al., Neural Baby Talk, Computer Vision and Pattern Recognition, 2018.

GitHub, allennlp-semparse, https://github.com/allenai/allennlp-semparse, Apr. 9, 2022.

Bai, Z., RNN vs. CNN vs. Transformer, https://baiblanc.github.io/2020/06/21/RNN-vs-CNN-vs-Transformer/, Jun. 21, 2020.

Weng, L, Attention? Attention! https://lilianweng.github.io/lil-log/2018/06/24/attention-attention.html, Jun. 24, 2018.

Hui, J., Speech Recognition—Deep Speech, CTC, Listen, Attend, and Spell, https://jonathan-hui.medium.com/speech-recognition-deep-speech-ctc-listen-attend-and-spell-d05e940e9ed1, Oct. 13, 2019.

* cited by examiner

AUTOMATED DOMAIN-SPECIFIC CONSTRAINED DECODING FROM SPEECH INPUTS TO STRUCTURED RESOURCES

BACKGROUND

The present application generally relates to information technology and, more particularly, to data processing techniques. More specifically, speech recognition techniques attempt to convert audio signals to corresponding text outputs. However, conventional speech recognition approaches commonly generate outputs that are inaccurate and/or incomplete.

SUMMARY

In at least one embodiment, techniques for automated domain-specific constrained decoding from speech inputs to structured resources are provided. An example computer-implemented method includes converting at least a portion of at least one user-provided speech utterance into text by processing the at least one user-provided speech utterance using an artificial intelligence-based automatic speech recognition model. The method also includes automatically training an artificial intelligence-based decoding engine, wherein automatically training the artificial intelligence-based decoding engine comprising constraining the artificial intelligence-based decoding engine based at least in part on a domain-specific model and the artificial intelligence-based automatic speech recognition model. Additionally, the method includes generating at least one of one or more domain-specific text outputs related to one or more structured resources associated with the domain and one or more domain-specific action outputs related to the one or more structured resources associated with the domain by processing at least a portion of the text using the artificial intelligence-based decoding engine.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, at least one embodiment includes automated domain-specific constrained decoding from speech inputs to structured resources. Such an embodiment includes using constrained decoding to learn from and/or process contextual information pertaining to the utterance that was spoken and/or is being analyzed. As is to be understood by one skilled in the art, speech recognition typically includes converting speech signals to corresponding text. Accordingly, one or more embodiments can include converting speech signals to arbitrarily structured resources such as, for example, forms, etc. Constrained decoding as used herein, refers to the notion that text cannot merely be transcribed, but the process is constrained by the form elements. As such, one or more embodiments include generating an output that includes an action over the form elements which is constrained by the form (e.g., if the form includes a radio button, such an embodiment can include selecting a relevant form element when audio corresponding to relevant words is processed).

Additionally, in one or more embodiments, phonetic variations dominated by frequently occurring phonemes are used (in connection with decoding tasks) in conjunction with domain information. Also, as detailed herein, at least one embodiment includes training and implementing an automatic speech recognition (ASR) model to decode arbitrarily-structured resources (e.g., choose radio buttons, fill the forms, etc.).

Figure 1:
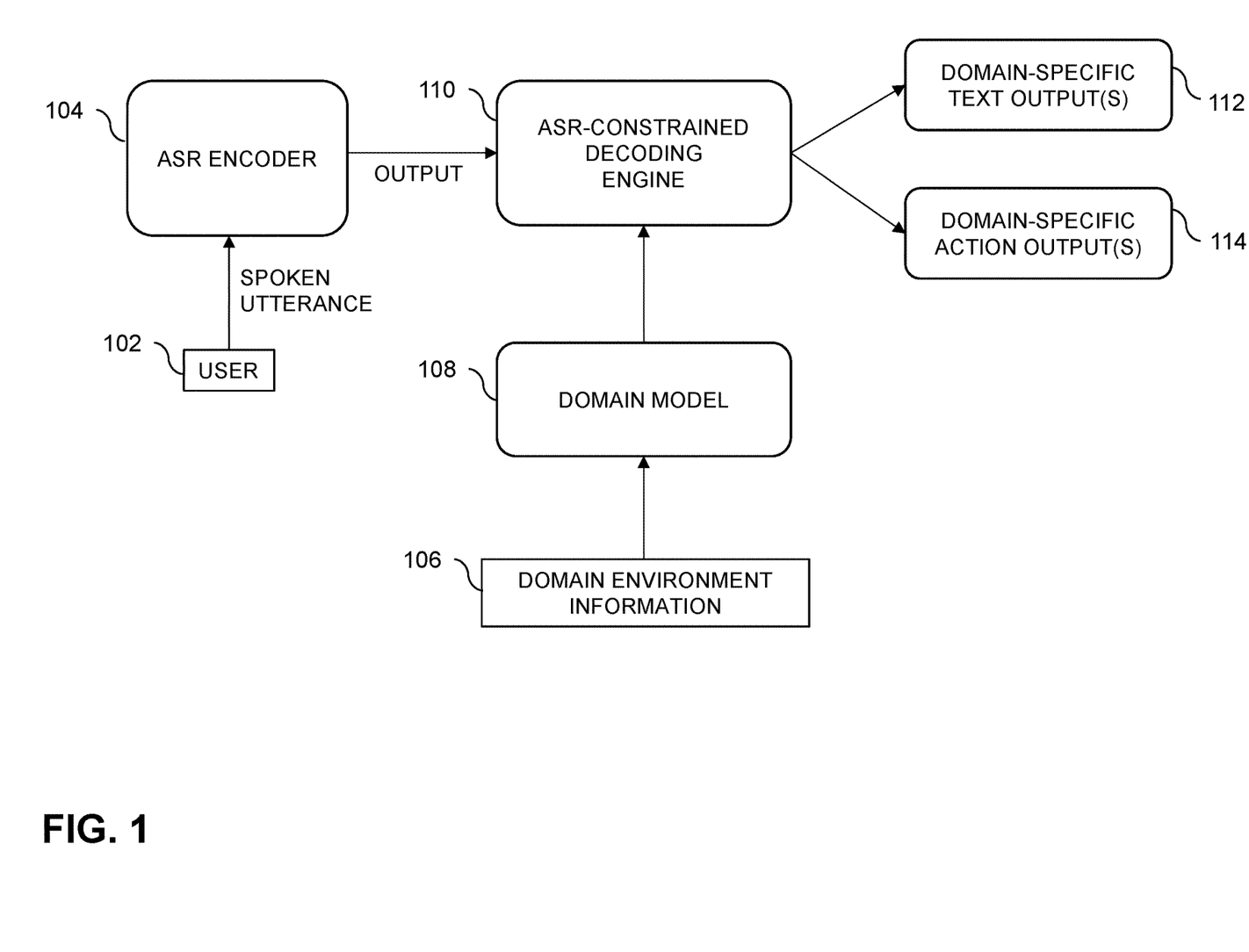
FIG. 1 is a diagram illustrating system architecture, according to an example embodiment of the invention.

FIG. 1 is a diagram illustrating system architecture, according to an example embodiment of the invention. By way of illustration, FIG. 1 depicts user 102 providing a spoken utterance to ASR encoder 104, which processes the spoken utterance and generates an output (which can include, for example, one or more phonemes and/or one or more graphemes). The output is provided to ASR-constrained decoding engine 110, which also receives input from domain model 108, which is trained using domain environment information 106 (e.g., tables, web pages, forms, etc.). Based at least in part on processing the output from ASR encoder 104 in conjunction with at least a portion of input provided by domain model 108, ASR-constrained decoding engine 110 generates one or more domain-specific text outputs 112 and/or one or more domain-specific action outputs 114. Illustrative example implementations of the system depicted in FIG. 1 are further detailed below in connection with FIG. 2 through FIG. 5.

Figure 2:
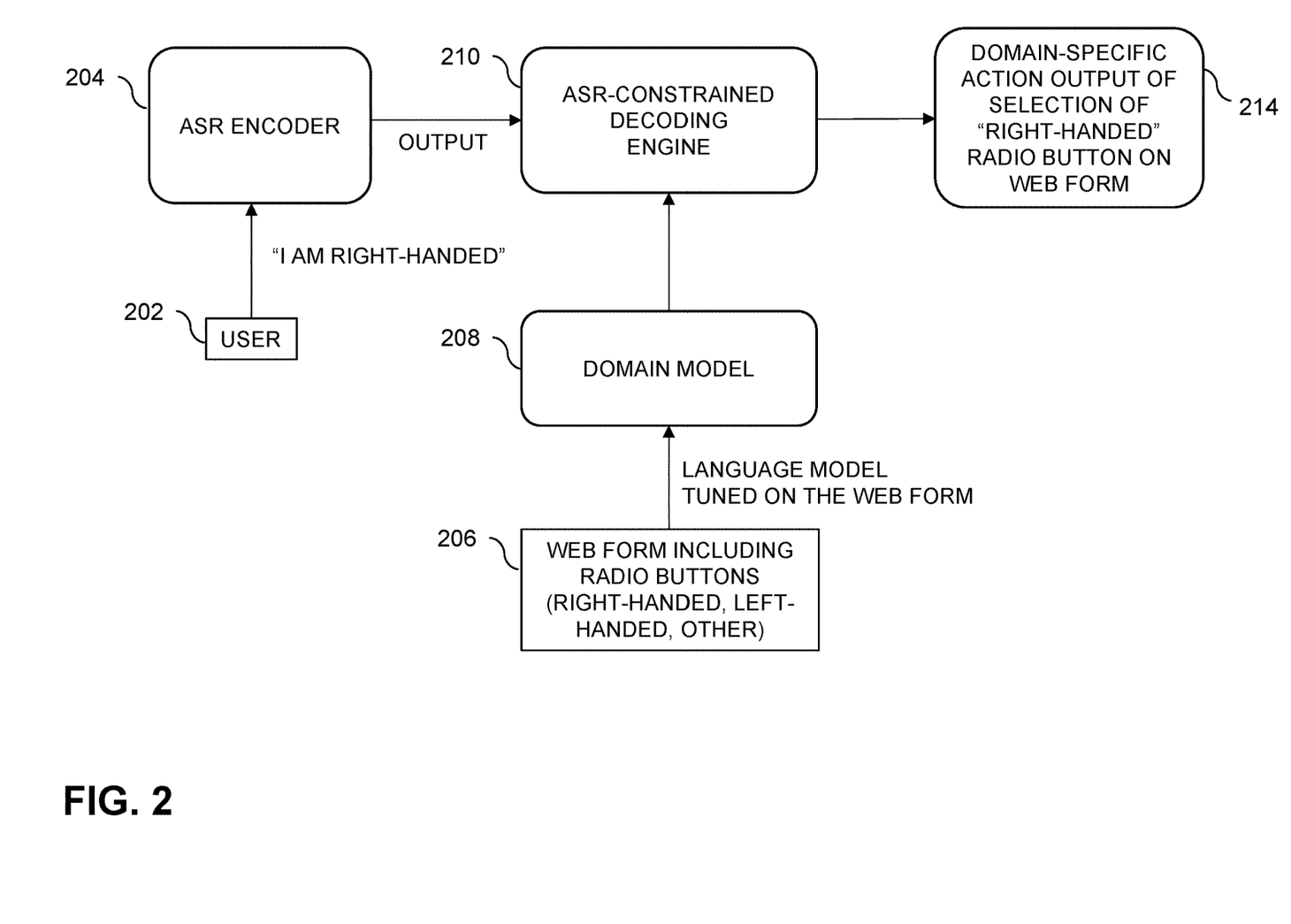
FIG. 2 is a diagram illustrating system architecture, according to an example embodiment of the invention.

FIG. 2 is a diagram illustrating system architecture, according to an example embodiment of the invention. More specifically, FIG. 2 depicts an example implementation involving a web form and corresponding radio buttons. By way of illustration, FIG. 2 depicts user 202 providing a spoken utterance of "I am right-handed" to ASR encoder 204, which processes the spoken utterance and generates an output (which can include, for example, one or more phonemes and/or one or more graphemes related to the "I am right-handed" input). The output is provided to ASR-constrained decoding engine 210, which also receives input from domain model 208, which is trained using a language model tuned on a web form 206, which includes radio buttons of "right-handed," "left-handed" and "other." Based at least in part on processing the output from ASR encoder 204 in conjunction with at least a portion of input provided by domain model 208, ASR-constrained decoding engine 210 generates a domain-specific action output 214 which includes selection of the "right-handed" radio button on the web form.

Figure 3:
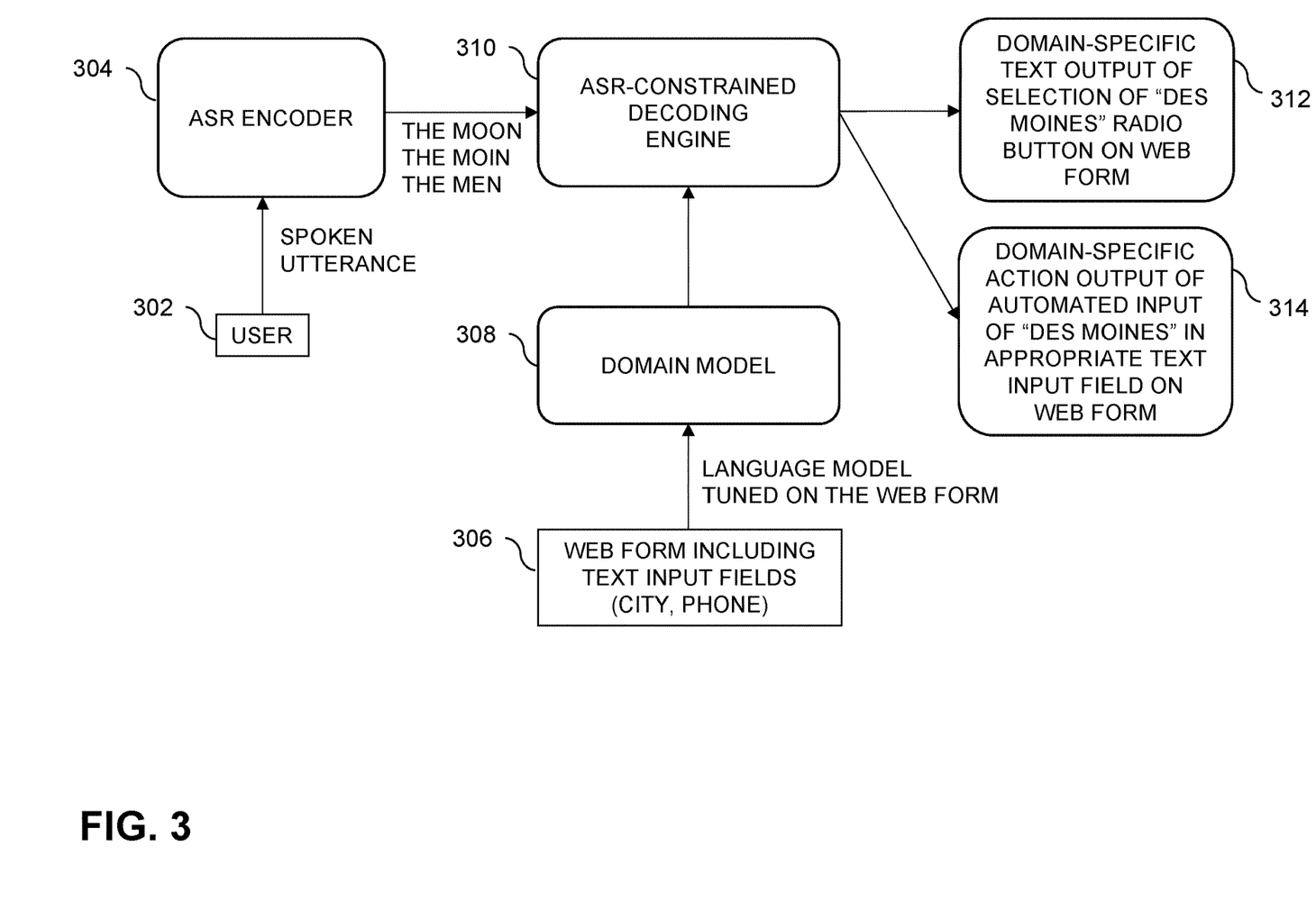
FIG. 3 is a diagram illustrating system architecture, according to an example embodiment of the invention.

FIG. 3 is a diagram illustrating system architecture, according to an example embodiment of the invention. More specifically, FIG. 3 depicts an example implementation involving a web form and corresponding text selection(s). By way of illustration, FIG. 3 depicts user 302 providing a spoken utterance to ASR encoder 304, which processes the spoken utterance and generates outputs which include versions and/or variations of the input spoken utterance (here, "The Moon," "The Moin," and "The Men"). The outputs are provided to ASR-constrained decoding engine 310, which also receives input from domain model 308, which is trained using a language model tuned on a web form 306, which includes text input fields for "City" and "Phone." Based at least in part on processing the outputs from ASR encoder 304 in conjunction with at least a portion of input provided by domain model 308, ASR-constrained decoding engine 310 generates a domain-specific text output 312 resulting in a selection of a "Des Moines" radio button on the web form, and a domain-specific action output 314 which includes the automated input of "Des Moines" in the appropriate text input field on the web form.

As noted in the example Figures as well as further detailed herein in connection with one or more embodiments, constrained decoding facilitates in understanding the context in which a given utterance was spoken. In the case of ASR, phonetic variations can be dominated by frequently occurring phonemes. Using such inputs in conjunction with domain-specific information (e.g., a domain model) further facilitates enhanced decoding.

Additionally, one or more embodiments can include implementing semantic parsing in connection with a constrained decoder (also referred to herein as a constrained decoding engine). Constrained decoding techniques can be used, for example, in connection with semantic parsing to produce programs from natural language constrained by the syntax and functional catalogue of the given execution engine. In at least one embodiment, hierarchical long short-term memory (LSTM) decoders can be used that decode in a syntactically constrained manner. In such an embodiment, the LSTM decoders first produce a syntax for a function $y=f(x)$, $[y, f, x]$. Subsequently, the LSTM decoders recursively fill the slots with further predictions of $[y, f, x]$. As used in this context, slots refer to entities within the domain model of a given sentence. For example, in a dialog, for each utterance, slots include a mapping of the entity name to the entity type (e.g., if a user wishes to take a flight from Boston to San Jose, the slots for a related utterance might include "source_destination: Boston" and "target_destination: San Jose." Such slots can be useful in conversation because they are typically not repeated in a dialog. For instance, if the user's next utterance is "I want a morning flight," then all of the slots can be collected and used to generate a query in the database with one or more appropriate filters. Hypertext Markup Language (HTML) generation and/or parsing methods can also use similar recursive methods.

Figure 4:
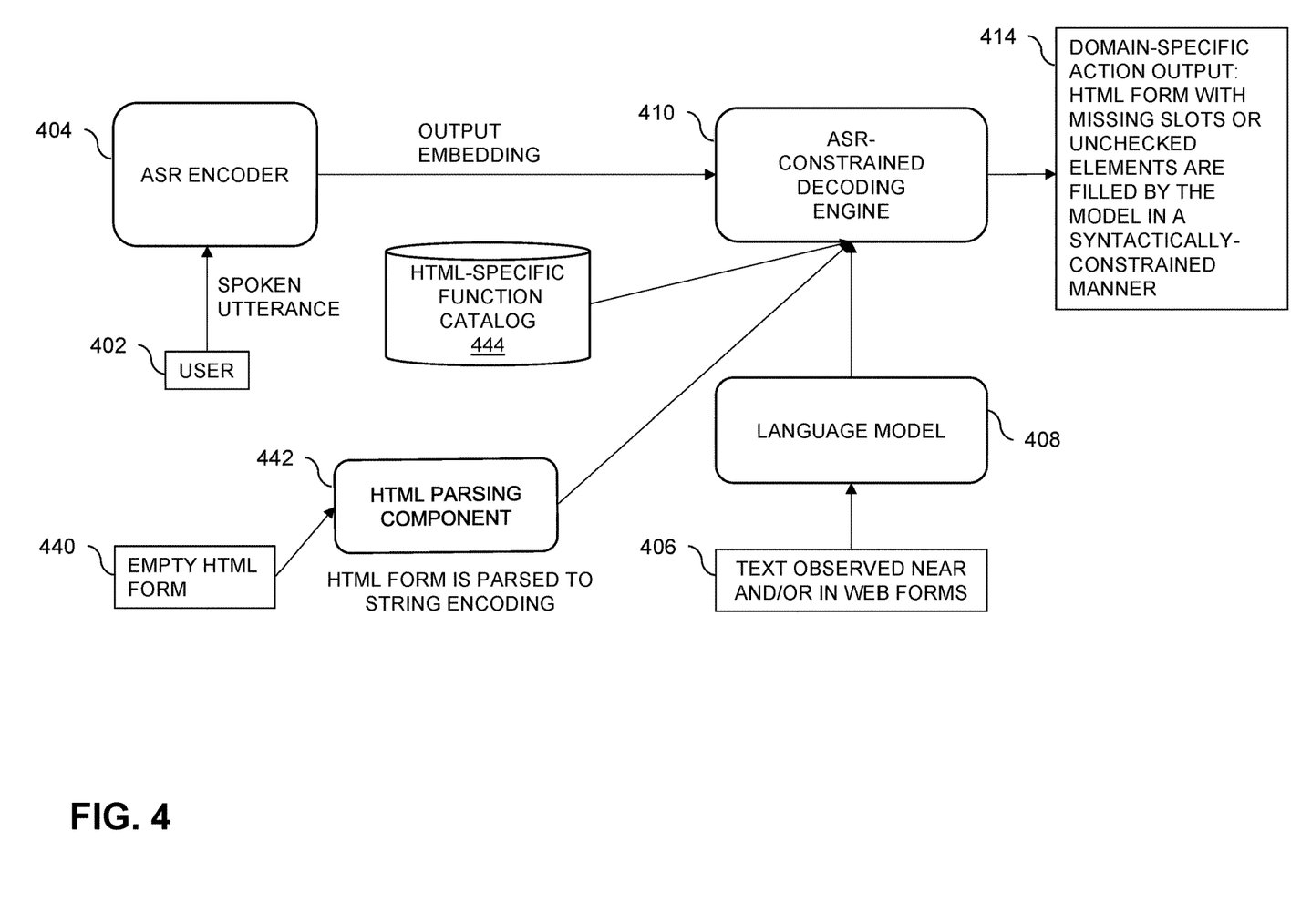
FIG. 4 is a diagram illustrating system architecture, according to an example embodiment of the invention.

FIG. 4 is a diagram illustrating system architecture, according to an example embodiment of the invention. More specifically, FIG. 4 depicts an example implementation involving ASR constrained decoding for HTML. By way of illustration, FIG. 4 depicts user 402 providing a spoken utterance to ASR encoder 404, which processes the spoken utterance and generates an output embedding (e.g., an advanced representation of speech input (e.g., in the form of a float vector)). The output embedding is provided to ASR-constrained decoding engine 410, which also receives input from language model 408, which is trained using text 406 observed near and/or in one or more web forms. ASR-constrained decoding engine 410 additionally receives input from an HTML-specific function catalog 444 (which can store, for example, details pertaining to the semantics and execution profile for each relevant HTML), common synonyms of various fields, etc.), as well as HTML form-related input. Specifically, an empty HTML form 440 is processed by HTML parsing component 442, which parses the empty HTML form 440 to string encoding, which is provided to the ASR-constrained decoding engine 410. In at least one embodiment, parsing the HTML form 440 to string encoding can include taking the HTML form 440 and converting the HTML form 440 into a machine representation via the means of parsing.

Based at least in part on processing the output from ASR encoder 404 in conjunction with at least a portion of input provided by language model 408, HTML-specific function catalog 444, and HTML parsing component 442, ASR-constrained decoding engine 410 generates a domain-specific action output 414 which includes filling in, in a syntactically-constrained manner, slots of an HTML form (e.g., HTML form 440) that are missing and/or unchecked. As used herein, with respect to a syntactically-constrained manner, for example, if the field identified is a radio-button, then field will get clicked, while if the field identified is a text field, the corresponding text would get populated. Depending on the form element type (i.e., constrained by the form element type), such an embodiment includes taking and/or initiating the appropriate execution step (filling, checking, etc.).

In one or more embodiments, such as the example embodiment depicted in FIG. 4, an ASR encoder can include, for example, at least one convolutional neural network (CNN) encoder, at least one quantizer, at least one transformer encoder, and/or at least one context representation information. Additionally, in such an embodiment, an ASR-constrained decoder (also referred to herein as an ASR-constrained decoding engine) can include, for example, one or more combined attention mechanism and LSTM model (ATT-LSTM) components.

Figure 5:
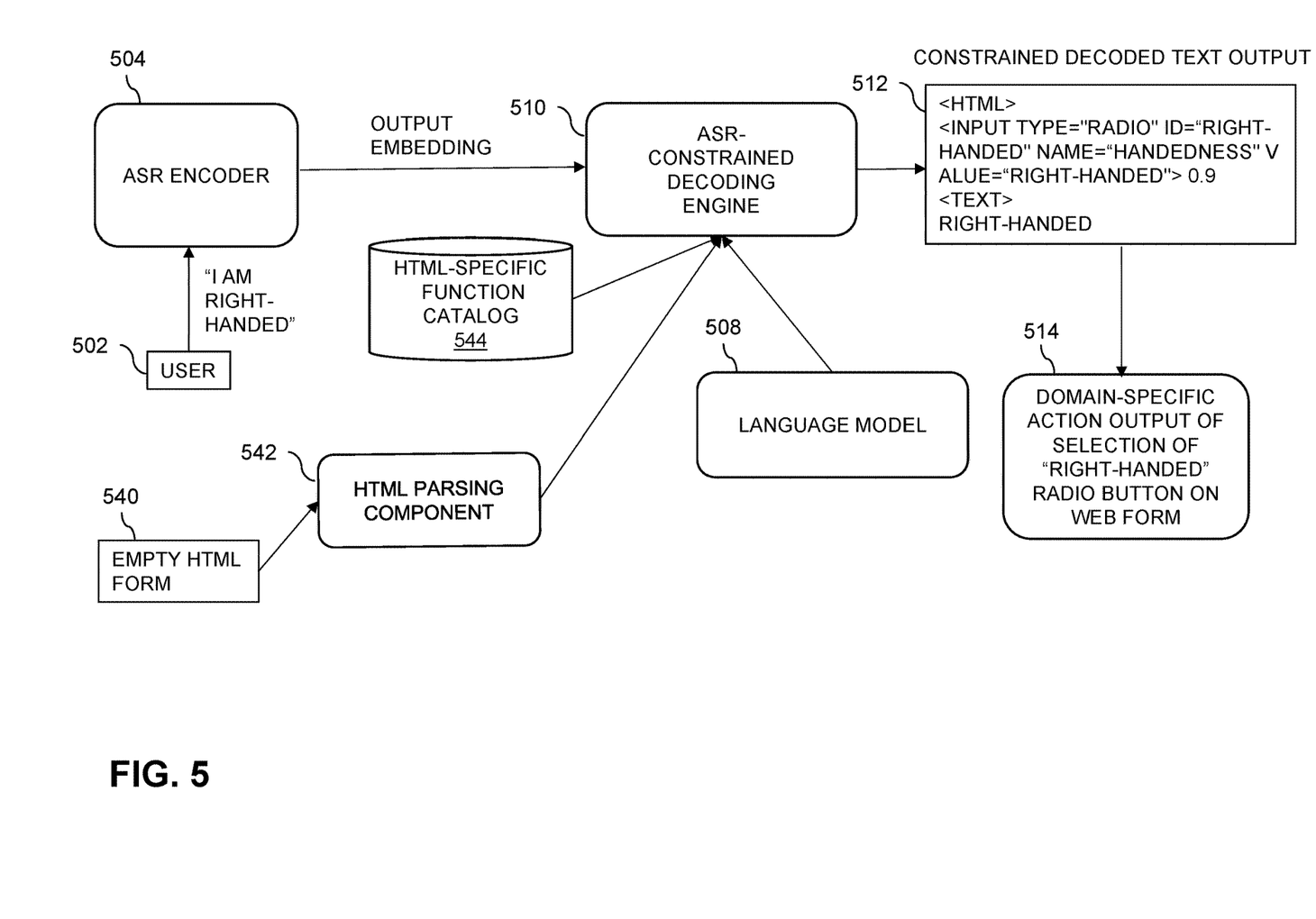
FIG. 5 is a diagram illustrating system architecture, according to an example embodiment of the invention.

FIG. 5 is a diagram illustrating system architecture, according to an example embodiment of the invention. More specifically, FIG. 5 depicts a running example implementation involving ASR constrained decoding for HTML. By way of illustration, FIG. 5 depicts user 502 providing a spoken utterance of "I am right-handed" to ASR encoder 504, which processes the spoken utterance and generates an output embedding. The output embedding is provided to ASR-constrained decoding engine 510, which also receives input from language model 508, HTML-specific function catalog 544, and HTML form-related input. Specifically, an empty HTML form 540 is processed by HTML parsing component 542, which parses the empty HTML form 540 to string encoding, which is provided to the ASR-constrained decoding engine 510.

Based at least in part on processing the output from ASR encoder 504 in conjunction with at least a portion of input provided by language model 508, HTML-specific function catalog 544, and HTML parsing component 542, ASR-constrained decoding engine 510 generates a constrained decoded text output 512 (for example, in the FIG. 5 embodiment, text output 512 includes indications that execution for the given HTML is prepared, which is then applied to the form), which is then used to perform a domain-specific action output 514 which includes automatically selecting a "right-handed" radio button on a given web form (that is, empty HTML form 540).

Accordingly, one or more embodiments can include implementing a model wherein the ASR encoder-decoder are trained for decoding HTML programs using examples. In such an embodiment using a new language (e.g., a new structured query language (SQL), etc.), the model is correspondingly retrained. Additionally, the constrained decoder ensures that the output is syntactically correct. By way of example, considering the embodiments depicted in FIG. 4 and FIG. 5, the constrained decoder uses an empty HTML form and a function catalog of HTML in furtherance of inserting one or more speech-to-text decoded tokens into valid slots on the HTML form.

Also, in one or more embodiments, an ASR encodes speech utterances and decodes at least a portion of the utterance (e.g., "boy") guided by a language model (LM). The LM can also assist an ASR decoder to determine one or more of the similarities between variations of the utterance (e.g., similarities between "boy" and "male") in a text space.

Additionally or alternatively, at least one embodiments includes using a framework for self-supervised learning of speech representations (e.g., a wav2vec2.0 encoder) in conjunction with a LSTM. More specifically, such an embodiment can include implementing a fully supervised approach using at least one pretrained speech encoder (e.g., a wav2vec2.0 encoder) and a hierarchical LSTM decoder. In connection with training such encoders and decoders, training data (X, y) can include speech signals of a user providing information for a given form (e.g., a web form, HTML form, etc.) in a natural setting (i.e., there is no requirement to provide specific cues or wait for the system to identify correct portion of the form). Also, in one or more embodiments, a ground truth-filled form can include text containing HTML tags in a correct syntax and responded tokens.

In at least one embodiment, a sub-routine of such training can include speech encoding, wherein a given speech signal is encoded using, for example, wav2vec 2.0 pretrained on speech data of the same language. The model can produce a fixed length vector codebase. Additionally, the ground truth HTML file is parsed and tokenized, and valid HTML tags are preprocessed. By way of example, consider the following: <label for="fname">First name:</label> <input type="text" id="fname" name="fname" value="John"> is converted to <input fn>="First name:" <input val>="John". In one or more embodiments, for the LSTM to predict only the missing slots, the LSTM predicts the missing token name, assisted by the LM.

One or more embodiments can also include implementing one or more extensions of a given decoder. Hierarchical trees can also be predicted using a stack of LSTMs such that the output prediction is similar to a tree structure slot filling LSTM. Additionally or alternatively, in at least one embodiment, a language conversion decoder model (e.g., text2SQL decoder model) with SQL functions replaced by HTML functions can be utilized and/or implemented. In such an embodiment, this model can produce additional HTML tags as permitted by the score of a given function catalog. In connection with one or more variants, at least one additional language model can be used for pruning search results to ensure that the voice tokens are converted to known language words but only for the missing slots of the given form.

In the deep learning setting, as detailed herein, one or more embodiments include using constrained LSTMs. For example, in a speech-to-text context, due to high data volume, noise, etc. pertaining to speech, the models can use long-beam search techniques (e.g., with a beam size of 100 or more) to search for a text transcript of the given speech. Further, example speech-to-text models use at least one language model to assist such a beam search to produce decoding text that has lower and/or reduced uncertainty over the language model.

Also, at least one embodiment can include directly producing filled forms from speech utterances by utilizing the structure of HTML tags and filling content in a slot-filling manner (in connection with one or more given structured resources).

Figure 6:
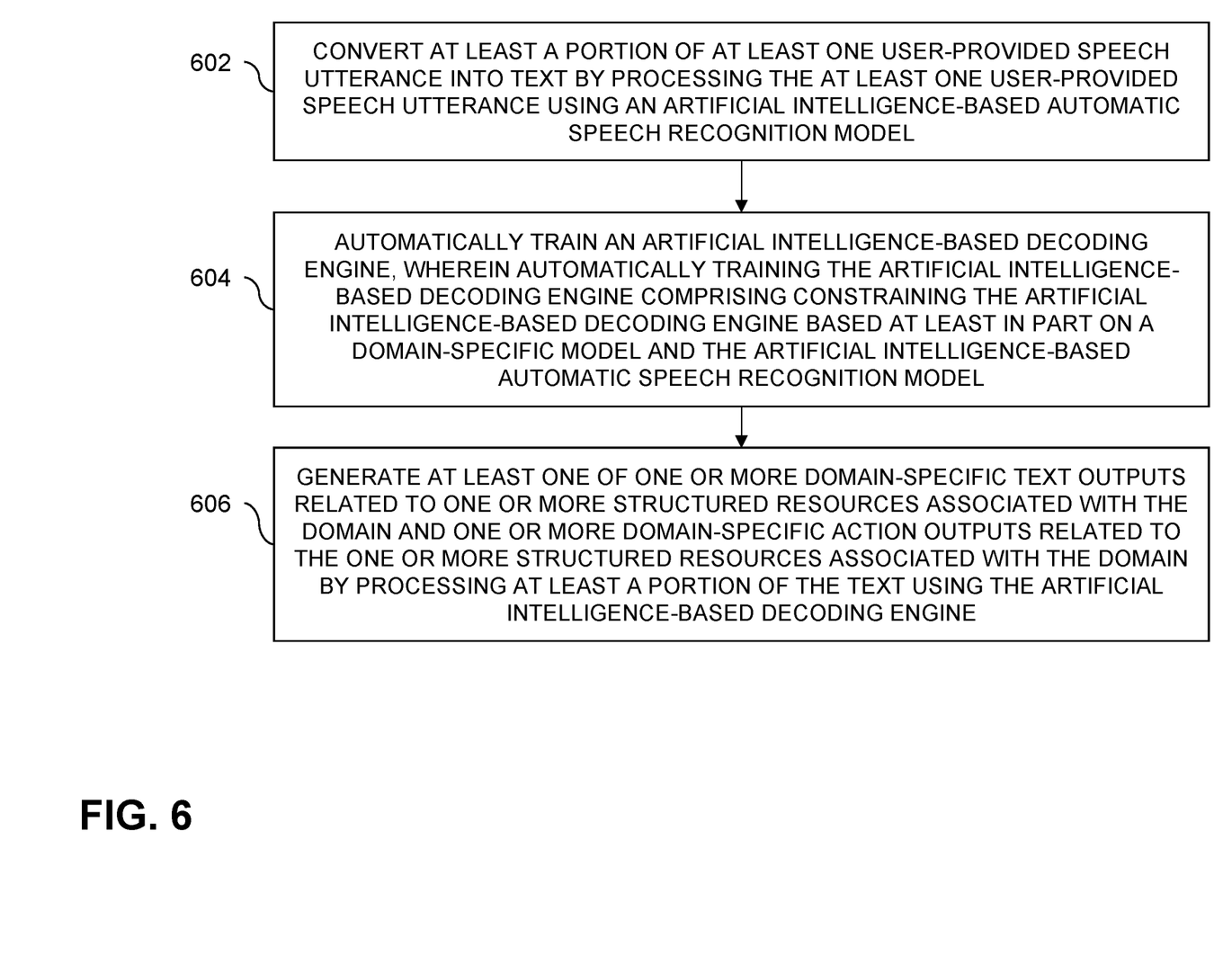
FIG. 6 is a flow diagram illustrating techniques according to an example embodiment of the invention.

FIG. 6 is a flow diagram illustrating techniques according to an embodiment of the present invention. Step 602 includes converting at least a portion of at least one user-provided speech utterance into text by processing the at least one user-provided speech utterance using an artificial intelligence-based automatic speech recognition model. In one or more embodiments, converting at least a portion of the at least one user-provided speech utterance into text includes determining multiple phonetic variations of the user-provided speech utterance based at least in part on one or more phonemes by processing the at least one user-provided speech utterance using the artificial intelligence-based automatic speech recognition model. Also, in at least one embodiment, the artificial intelligence-based automatic speech recognition model includes a supervised encoder pertaining to speech representations.

Step 604 includes automatically training an artificial intelligence-based decoding engine, wherein automatically training the artificial intelligence-based decoding engine comprising constraining the artificial intelligence-based decoding engine based at least in part on a domain-specific model and the artificial intelligence-based automatic speech recognition model. In at least one embodiment, the artificial intelligence-based decoding engine can include a set of one or more hierarchical LSTM decoders and/or one or more combined ATT-LSTM components. Also, in one or more embodiments, constraining the artificial intelligence-based decoding engine is further based at least in part on the one or more structured resources associated with the domain.

Additionally, one or more embodiments can include automatically training the domain-specific model using domain environment information. Further, in such an embodiment, the domain-specific model can include a model pertaining to a specific language and/or a model pertaining to a specific topic.

Step 606 includes generating at least one of one or more domain-specific text outputs related to one or more structured resources associated with the domain and one or more domain-specific action outputs related to the one or more structured resources associated with the domain by processing at least a portion of the text using the artificial intelligence-based decoding engine. As also detailed herein, in one or more embodiments, the one or more structured resources can include one or more web forms (e.g., one or more HTML-based web forms).

The techniques depicted in FIG. 6 can also include automatically executing the one or more domain-specific action outputs. In one or more embodiments, automatically executing the one or more domain-specific action outputs can include automatically selecting one or more radio buttons in connection with the one or more structured resources associated with the domain and/or automatically inserting text into one or more web forms associated with the domain.

Additionally, at least one embodiment can also include retraining the artificial intelligence-based decoding engine based at least in part on at least one of the one or more domain-specific text outputs and the one or more domain-specific action outputs. Further, in one or more embodiments, software implementing the method can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
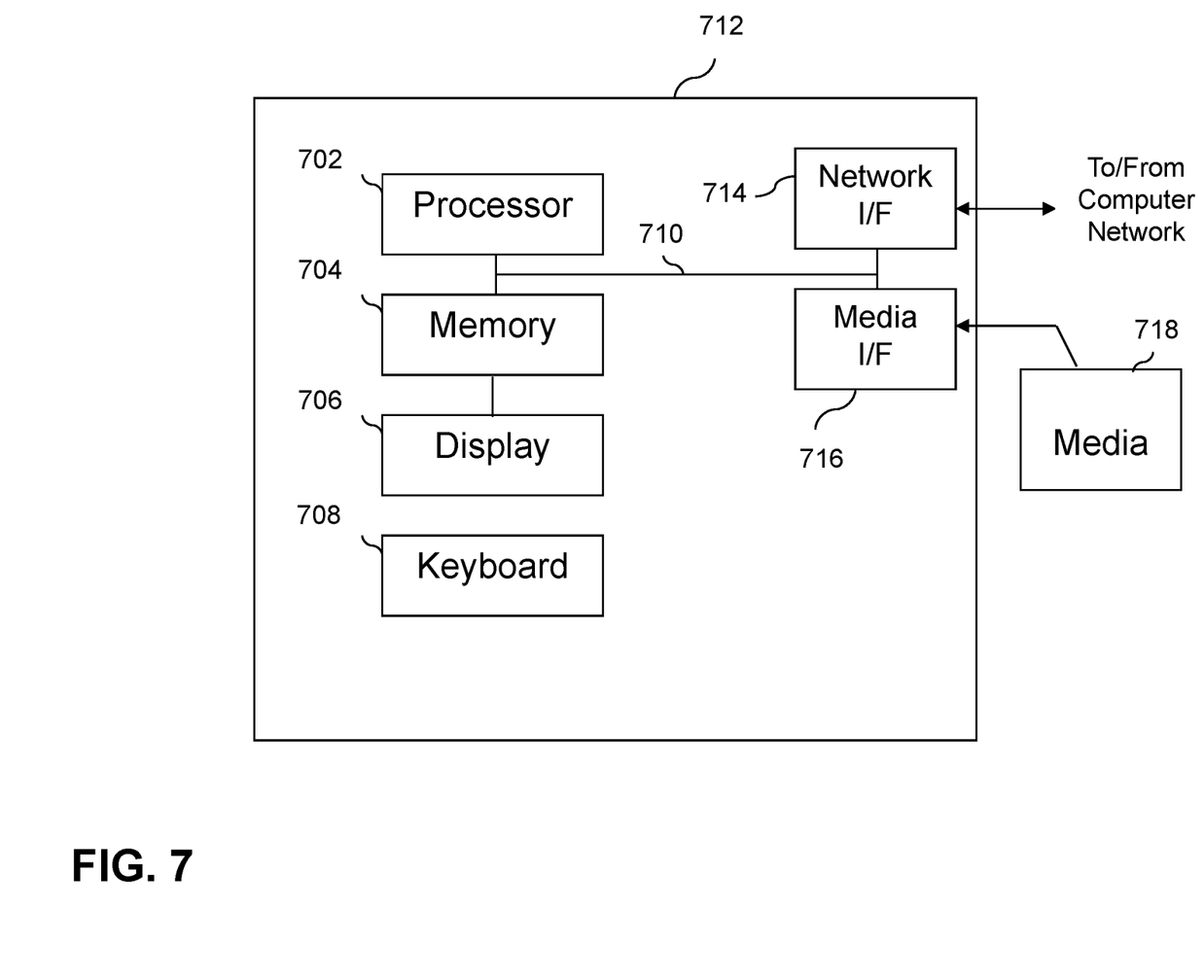
FIG. 7 is a system diagram of an example computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
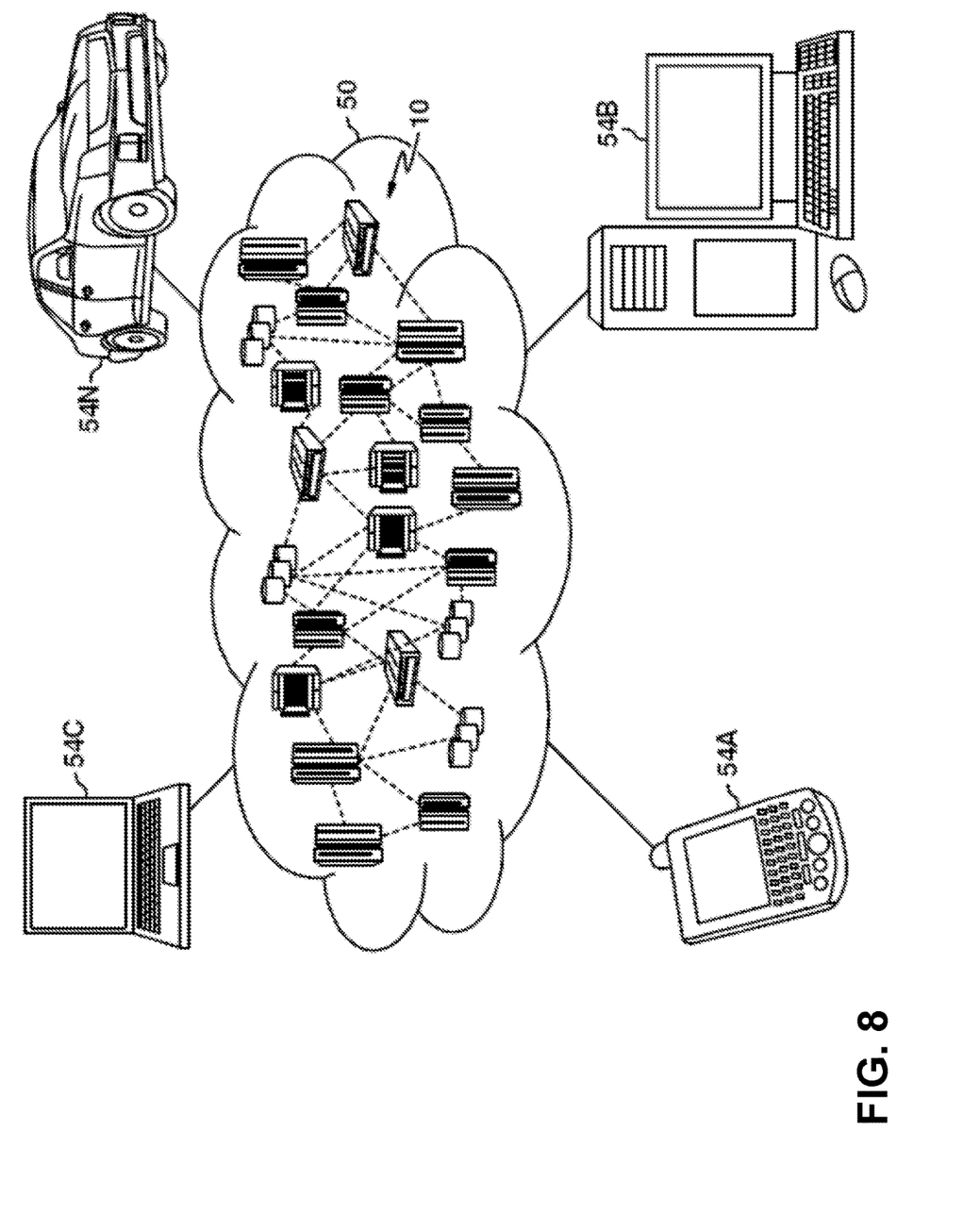
FIG. 8 depicts a cloud computing environment according to an example embodiment of the invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
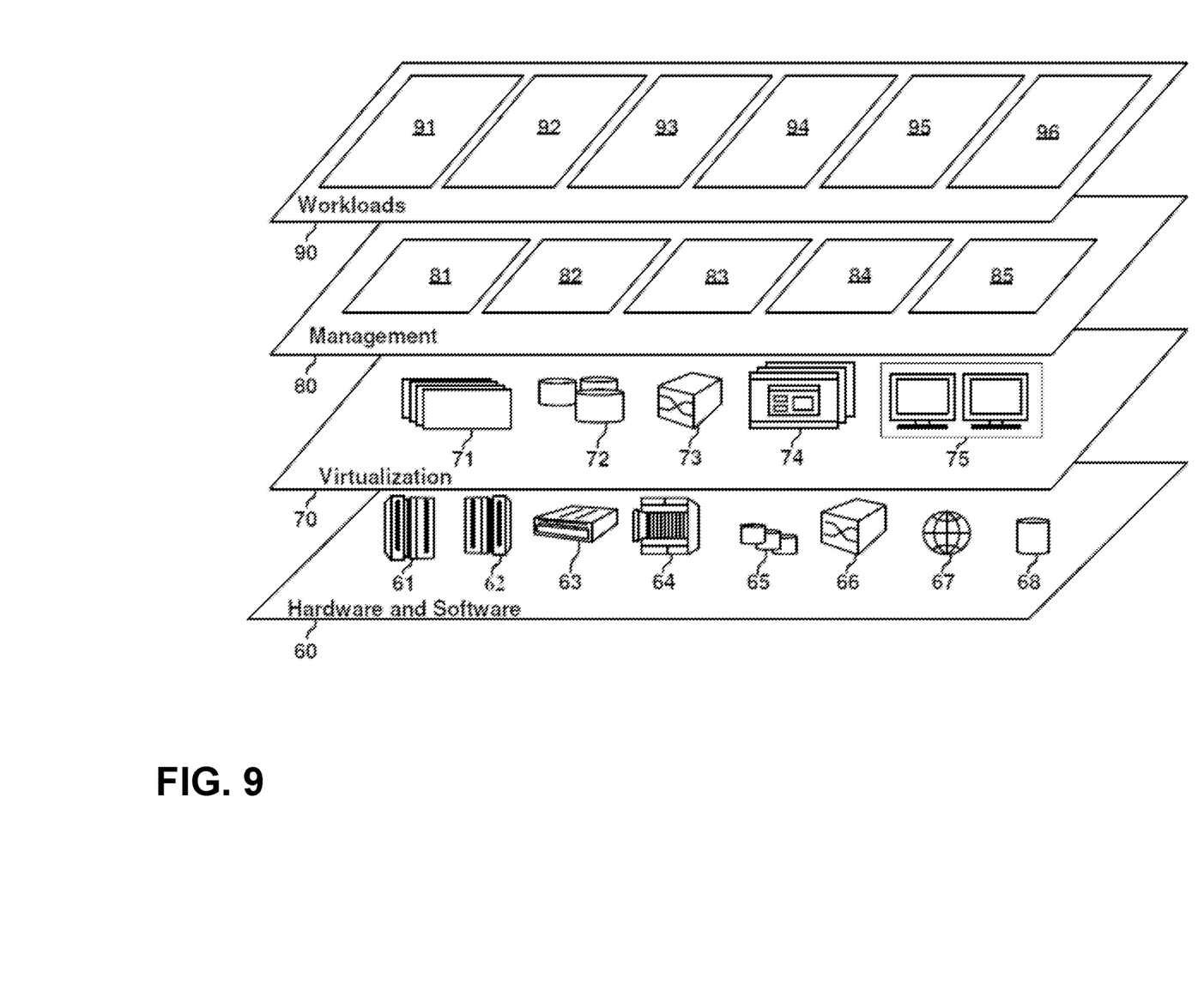
FIG. 9 depicts abstraction model layers according to an example embodiment of the invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated speech recognition 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automated domain-specific constrained decoding from speech inputs to structured resources.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
converting at least a portion of at least one user-provided speech utterance into text by processing the at least one user-provided speech utterance using an artificial intelligence-based automatic speech recognition model;
automatically training an artificial intelligence-based decoding engine, wherein automatically training the artificial intelligence-based decoding engine comprises constraining the artificial intelligence-based decoding engine based at least in part on a domain-specific model, one or more structured resources, and the artificial intelligence-based automatic speech recognition model, wherein the one or more structured resources comprise one or more web forms associated with the domain;
generating one or more domain-specific text outputs and automatically inserting at least a portion of the one or more domain-specific text outputs into at least one of the one or more web forms associated with the domain associated with the domain by processing at least a portion of the text using the artificial intelligence-based decoding engine; and
automatically performing one or more domain-specific actions within the one or more web forms associated with the domain by processing at least a portion of the text using the artificial intelligence-based decoding engine;
wherein the method is carried out by at least one computing device.

2. The computer-implemented method of claim 1, further comprising:
automatically executing the one or more domain-specific action outputs.

3. The computer-implemented method of claim 2, wherein automatically executing the one or more domain-specific action outputs comprises automatically selecting one or more radio buttons in connection with the one or more structured resources associated with the domain.

4. The computer-implemented method of claim 1, wherein the artificial intelligence-based decoding engine comprises a set of one or more hierarchical long short-term memory decoders.

5. The computer-implemented method of claim 1, wherein the artificial intelligence-based decoding engine comprises one or more combined attention mechanism and long short-term memory model (ATT-LSTM) components.

6. The computer-implemented method of claim 1, wherein converting at least a portion of the at least one user-provided speech utterance into text comprises determining multiple phonetic variations of the user-provided speech utterance based at least in part on one or more phonemes by processing the at least one user-provided speech utterance using the artificial intelligence-based automatic speech recognition model.

7. The computer-implemented method of claim 1, wherein the artificial intelligence-based automatic speech recognition model comprises a supervised encoder pertaining to speech representations.

8. The computer-implemented method of claim 1, further comprising:
automatically training the domain-specific model using domain environment information.

9. The computer-implemented method of claim 1, wherein the domain-specific model comprises at least one of a model pertaining to a specific language and a model pertaining to a specific topic.

10. The computer-implemented method of claim 1, wherein the one or more web forms comprise one or more Hypertext Markup Language-based web forms.

11. The computer-implemented method of claim 1, further comprising:
retraining the artificial intelligence-based decoding engine based at least in part on at least one of the one or more domain-specific text outputs and the one or more domain-specific action outputs.

12. The computer-implemented method of claim 1, wherein software implementing the method is provided as a service in a cloud environment.

13. A computer program product comprising a computer readable storage medium having program instructions embodied therewith, the program instructions executable by a computing device to cause the computing device to:
convert at least a portion of at least one user-provided speech utterance into text by processing the at least one user-provided speech utterance using an artificial intelligence-based automatic speech recognition model;
automatically train an artificial intelligence-based decoding engine, wherein automatically training the artificial intelligence-based decoding engine comprises constraining the artificial intelligence-based decoding engine based at least in part on a domain-specific model, one or more structured resources, and the artificial intelligence-based automatic speech recognition model, wherein the one or more structured resources comprise one or more web forms associated with the domain;
generate one or more domain-specific text outputs and automatically inserting at least a portion of the one or more domain-specific text outputs into at least one of the one or more web forms associated with the domain associated with the domain by processing at least a portion of the text using the artificial intelligence-based decoding engine; and
automatically perform one or more domain-specific actions within the one or more web forms associated with the domain by processing at least a portion of the text using the artificial intelligence-based decoding engine.

14. The computer program product of claim 13, wherein the program instructions executable by a computing device to cause the computing device to:
automatically execute the one or more domain-specific action outputs.

15. The computer program product of claim 14, wherein automatically executing the one or more domain-specific action outputs comprises automatically selecting one or more radio buttons in connection with the one or more structured resources associated with the domain.

16. A system comprising:
a memory configured to store program instructions; and
a processor operatively coupled to the memory to execute the program instructions to:
convert at least a portion of at least one user-provided speech utterance into text by processing the at least one user-provided speech utterance using an artificial intelligence-based automatic speech recognition model;
automatically train an artificial intelligence-based decoding engine, wherein automatically training the artificial intelligence-based decoding engine comprises constraining the artificial intelligence-based decoding engine based at least in part on a domain-specific model, one or more structured resources, and the artificial intelligence-based automatic speech recognition model, wherein the one or more structured resources comprise one or more web forms associated with the domain;
generate one or more domain-specific text outputs and automatically inserting at least a portion of the one or more domain-specific text outputs into at least one of the one or more web forms associated with the domain associated with the domain by processing at least a portion of the text using the artificial intelligence-based decoding engine; and
automatically perform one or more domain-specific actions within the one or more web forms associated with the domain by processing at least a portion of the text using the artificial intelligence-based decoding engine.

17. The system of claim 16, wherein converting at least a portion of the at least one user-provided speech utterance into text comprises determining multiple phonetic variations of the user-provided speech utterance based at least in part on one or more phonemes by processing the at least one user-provided speech utterance using the artificial intelligence-based automatic speech recognition model.

18. The system of claim 16, wherein the artificial intelligence-based decoding engine comprises a set of one or more hierarchical long short-term memory decoders.

19. The system of claim 16, wherein the artificial intelligence-based decoding engine comprises one or more combined attention mechanism and long short-term memory model (ATT-LSTM) components.

20. The system of claim 16, wherein the artificial intelligence-based automatic speech recognition model comprises a supervised encoder pertaining to speech representations.

* * * * *